United States Patent
Vieley et al.

[19]

[11] Patent Number: 6,082,642
[45] Date of Patent: Jul. 4, 2000

[54] APPARATUS AND METHOD FOR PULVERIZING COMPRESSIBLE MATERIALS

[76] Inventors: Robert J. Vieley, 1756 Greenview Ave., Corona, Calif. 91720; Kermit L. Achterman, 535 Knights Way, La Canada Flintridge, Calif. 91011

[21] Appl. No.: 09/241,118

[22] Filed: Feb. 1, 1999

[51] Int. Cl.[7] .............................. B02C 19/00; B02C 19/12
[52] U.S. Cl. .......................... 241/27; 241/280; 241/281; 241/282; 241/DIG. 31
[58] Field of Search ................................. 241/27, 260.1, 241/280, 281, 282, DIG. 31, 277

[56] References Cited

U.S. PATENT DOCUMENTS

| | | | |
|---|---|---|---|
| 984,758 | 2/1911 | Gardner | 241/282 X |
| 1,133,952 | 3/1915 | Gare | 241/DIG. 31 X |
| 2,215,435 | 9/1940 | Hale | 241/DIG. 31 X |
| 4,474,334 | 10/1984 | Tatai et al. | 241/1 |
| 4,929,086 | 5/1990 | Geyer | 366/76.93 |
| 5,375,775 | 12/1994 | Keller et al. | 241/19 |
| 5,799,880 | 9/1998 | Robertson et al. | 241/1 |

*Primary Examiner*—John M. Husar
*Attorney, Agent, or Firm*—Edgar W. Averill, Jr.

[57] ABSTRACT

An apparatus for pulverizing a collection of pieces of materials such as vulcanized rubber to create a very fine powder. The apparatus includes a piston and a cylinder which places the material to be pulverized under extremely high pressure of at least 1,000 psi and forcing the compressed material out of one or more exit ports. These exit ports are located at the end of a smoothly narrowed channel leading to the exit ports. A rapidly moving cutter is positioned so that its path completely covers the exit port. The compressible materials are thus compressed to the point where they have no voids and provide a solid incompressible cuttable face. The rapidly moving cutter creates a fine powder at the exit port.

15 Claims, 9 Drawing Sheets

APPARATUS AND METHOD FOR PULVERIZING COMPRESSIBLE MATERIALS

BACKGROUND OF THE INVENTION

The field of the invention is cutting or shredding of a collection which collection is compressible. The term "compressible" is meant to refer to an aggregation of pieces of material which aggregation is compressible to an essentially void free state. The process of the present invention is particularly effective for comminuting a collection of elastic compressible materials such as pieces of vulcanized rubber. It is also useful for comminuting a collection of less elastic materials such as used carpets which can be compressed from an original low density configuration to a compressed high density and essentially void free material when subjected to sufficient pressure.

Perhaps the most common problem is that of pulverizing vulcanized rubber. The amount of waste created by discarded tires has created a worldwide waste removal problem which to date has not been solved in any practical manner. Another less known waste problem is the discarded sprews which are created when rubber parts are transfer molded. Unlike plastic waste which can be reprocessed by melting, cross linked rubber is not meltable and, thus, not easily re-processed. Various chemical methods are known which digest and permit such cured rubber to be reclaimed, but the reclaimed rubber degrades the quality of the final molded parts so that it can be used only in low grade applications such as floor mats. Various mechanical rubber grinders have been developed. Intermeshed wheels have been used, such as that shown in U.S. Pat. Nos. 4,052,013 and 5,048,764, but such devices of this type are limited in the particle size which they produce. For instance, in the tire shredding apparatus shown in U.S. Pat. No. 4,052,013, the ground rubber particles merely have to pass through a screening drum with openings of 3" diameter to produce a particle which is suitable as boiler feed. Unfortunately, the burning of rubber particles requires the need for expensive air pollution removing means since the rubber contains sulfur and other products which are capable of creating highly toxic products of combustion.

U.S. Pat. No. 5,100,069 utilizing interlocking shearing blades produces particles having a size less then 1" by 1". If the rubber particles are sufficiently cool they cease to be compressible and may be crushed in equipment of the type utilized for crushing rock and other solids. Such a process is shown in U.S. Pat. No. 4,813,614.

A machine which claims to produce a very finely powdered rubber is shown in U.S. Pat. No. 984,758 where particles of rubber are pushed against a wheel which has a grinding surface. Such a process generates a great deal of heat and for that reason, air is forced through the particles of rubber before they hit the grinder and air is also forced through the grinder to try to cool the face of the grinder.

A cutter wheel is shown in U.S. Pat. No. 5,375,775 which reduces vehicle tires to very fine particles by passing tire treads against a wheel with extending knives which form a shearing action against a fixed blade assembly 26.

Uncured rubber is not cross linked and may be readily softened and extruded in spaghetti-like rods and cut by moving blades as shown in U.S. Pat. No. 2,215,435. The resulting product is compared to corn flakes which are dusted with carbon black to prevent them from sticking together. Such flaked crude rubber is more easily processed than the unflaked bales of crude rubber.

Another machine for cutting up crude rubber is shown in U.S. Pat. No. 3,001,728. This process operates on uncured rubber, not a cross-linked product. Russian Patent No. 982,797 shows another device which cuts up bales of rubber which are uncured.

German Patent No. 1,298,867 shows a device for disintegrating plastic waste material which utilizes a cutter which is fed by a piston. Japanese Patent No. 5-329,389 grinds waste rubber by rotating an abrasive cone in a conical chamber which is fed by a screw. The process creates a great deal of friction which heats the rubber and thereby vaporizes the sulfur, which of course, creates air pollution and waste disposal problems. East German Patent No. 212,694 reprocesses rubberized cord fabric. A ram covers the length of the hopper but only half of the width of the hopper. A screw forces the material through a hardened nozzle over which is located a rotating cutter which rotates coaxially with the screw and has a number of blades which cut the rubberized cord into smaller pieces.

Japanese Patent No. 3-60748 utilizes a screw which pressurizes rubber pieces and extrudes them through a plate containing holes. The projected pieces are cut by a cutter fitted at the end of the screw shaft. This design is not unlike a conventional meat grinder.

A Russian Patent No. 1351-666 shows a device for milling clay with hard lumps. The clay is fed by a screw into a compacting head which feeds the lumpy clay against a rotating cutter. Such lumps of clay would be considered friable or easily breakable conglomerates unlike pieces of cured rubber.

To summarize, there are many machines capable of breaking vulcanized rubber particles into small pieces such as 1" diameter chunks. Processes which are capable of further breaking down compressible cross link materials into a very fine powder in the past have generated a great deal of heat which creates toxic or noxious fumes, which, in today's industrial setting, would be unacceptable. There is, thus, a need for a process which is capable of turning such materials into a very fine powder which does not generate significant heat, and yet, reduces the end product to a very fine powder, such as 100 mesh or 200 mesh. When cured rubber is broken down to this fine consistency, it can be added back to finished product and actually have no deleterious effect on the virgin rubber at all. Thus, a waste disposal problem is converted to a valuable raw material.

BRIEF SUMMARY OF THE INVENTION

It is an object of the present invention to provide an apparatus and a process for comminuting (reducing in size or pulverizing) compressible materials into a very fine powder without generating any significant amount of heat so that toxic or malodorous fumes are generated.

The present invention is for an apparatus for comminuting compressible materials such as a collection of pieces of cured rubber. The apparatus utilizes extremely high pressure which compresses the compressible materials to a near void-free solid state and while so compressed, passes a series of cutter teeth rapidly over the compressed face, cutting very fine particles from the face, utilizing a cutting action rather than a friction action. The apparatus has a force applying member such as a piston located in a cylinder which cylinder has a smoothly narrowed exit area where the exit area is so small that a pressure at the piston face of up to 8000 psi is achievable even when the exit area is unobstructed. For example, if the piston did not have a narrowed exit area, a pressure such as 1,000 psi at the entrance end would simply force the material out of the exit end and jam any cutting apparatus. A rapidly moving cutter is positioned immediately adjacent the exit port so there is no space between the path of the cutters and the exit port. Preferably, there are a plurality of exit ports and the inner intersection between adjacent exit ports is preferably a sharp intersection so that there is no area for material to build up.

The process of the present invention as applied to vulcanized rubber includes the steps of placing pieces of vulcanized rubber in a cylinder and subjecting the pieces to the force of a force applying member such as a piston exerting a force of at least 500 psi. The pieces thus compressed are forced into a reduced exit port and a plurality of cutting means are positioned immediately over the surface of the exit port so that small pieces are cut off without generating substantial heat.

DESCRIPTION OF THE PREFERRED EMBODIMENTS

Figure 1:
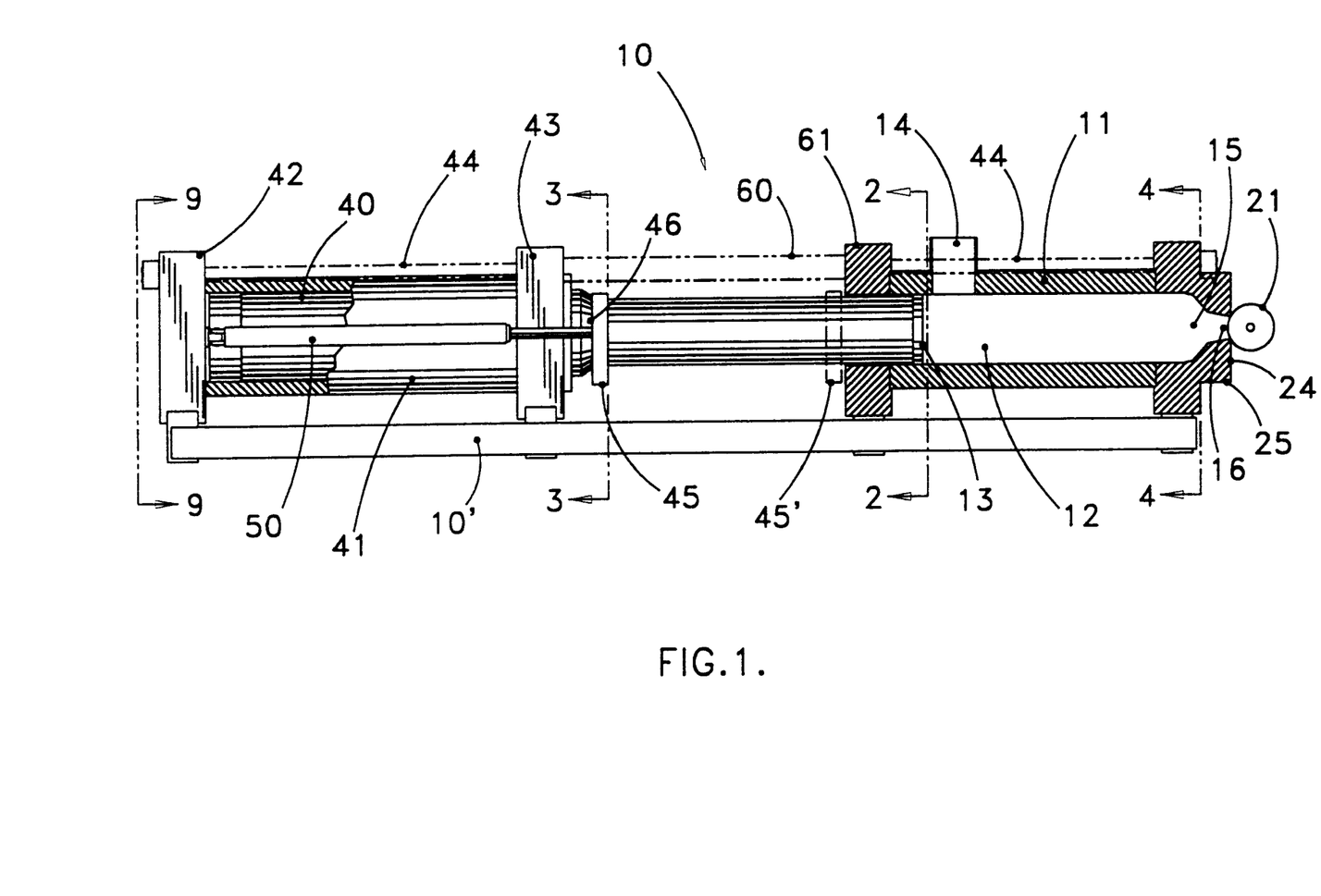
FIG. 1 is a side view partly broken away showing the apparatus for comminuting compressible materials of the present invention.

The apparatus for comminuting compressible collection of elastic materials is shown in side view partly in cross-section in FIG. 1 and indicated generally by reference character 10. It is supported on frame 10'. The apparatus has a hollow cylinder 11 which has a first length of uniform cross-sectional shape 12 along which a piston 13 passes. An inlet 14 is used for placing material into the cylinder 11.

Figure 4:
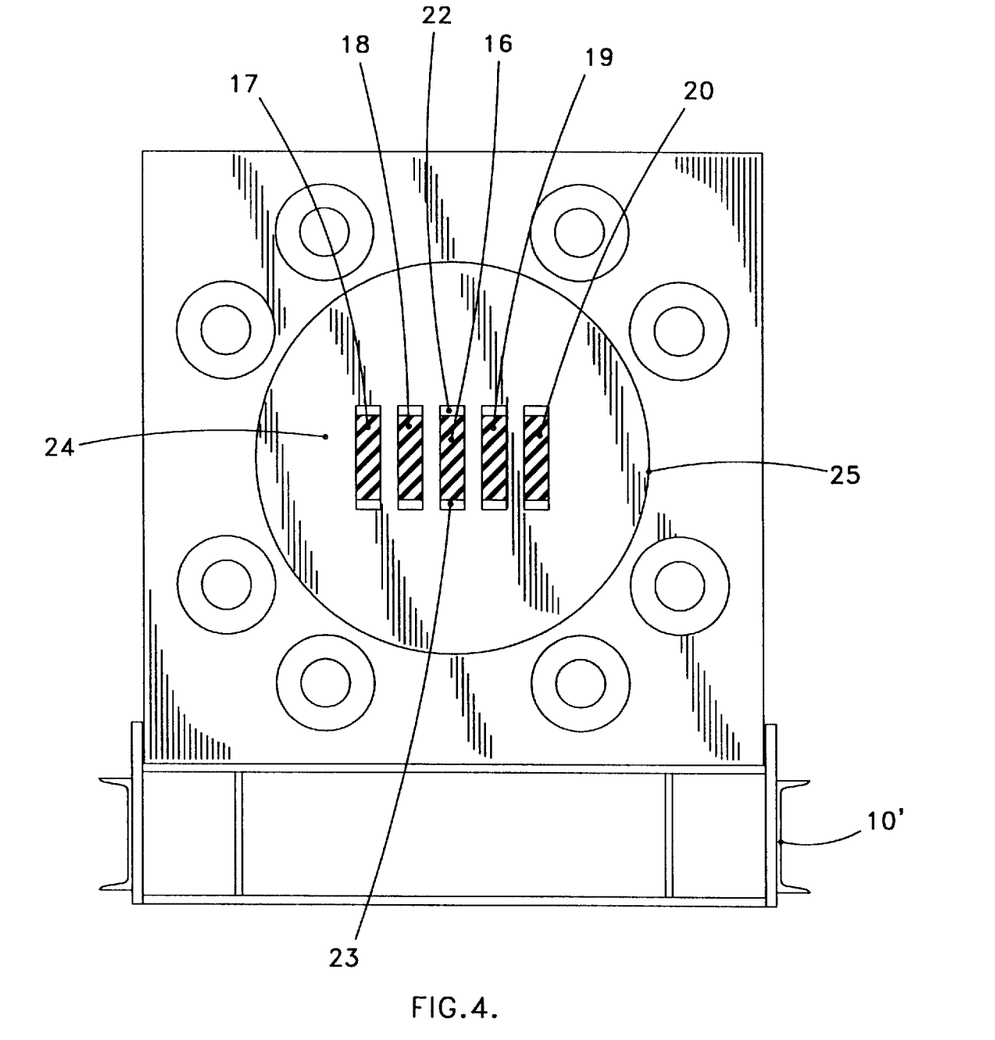
FIG. 4 is a front view of the cylinder head of the apparatus of FIG. 1 taken along line 4—4 of FIG. 1.
Figure 6:
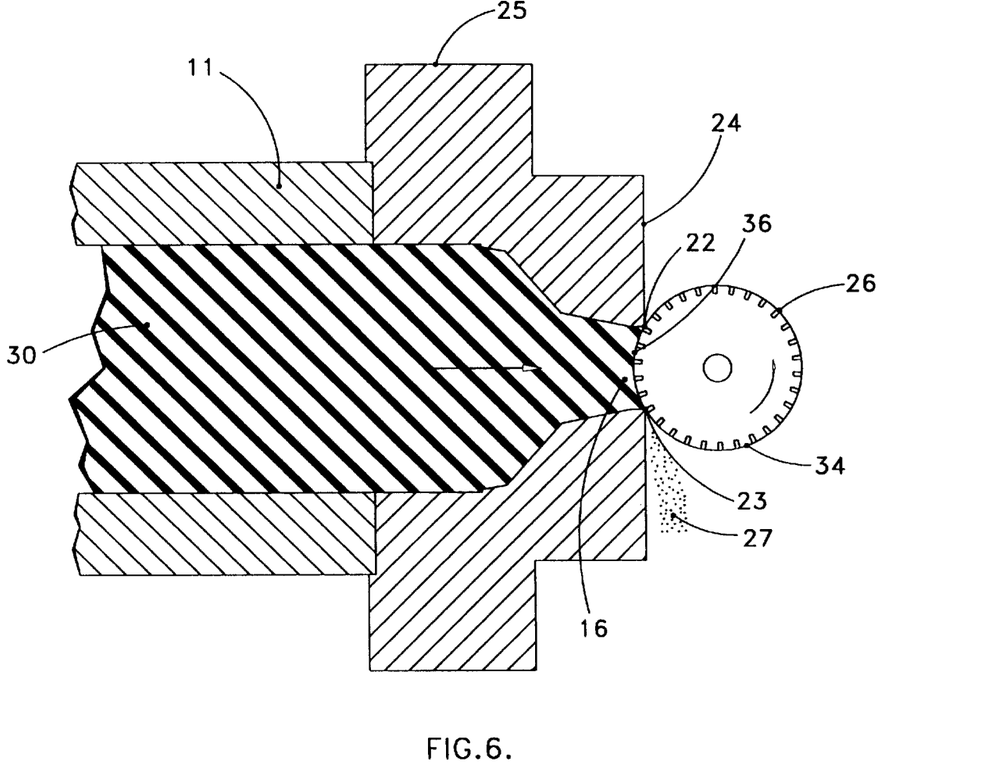
FIG. 6 is a cross-sectional view of the cylinder head and one of the cutters of FIG. 1.

At an exit end of cylinder 11, a smoothly narrowed exit length 15 is formed which ends in one or more exit ports 16. The exit ports are rectangular as shown best in FIG. 4 where exit ports 16, 17, 18, 19, and 20 are also shown for a total of five exit ports. A cutter 21 is shown in side view in FIG. 1 and is positioned so that its blades completely cover exit port 16. As shown in FIG. 4, exit port 16 has two areas 22 and 23 which are cut into the face 24 in cylinder head 25. As shown best in FIG. 6, this resulting recess provides no area where the high pressure material can exit and only fine particles cut by blades 26 can exit as particles 27 as shown in FIG. 6.

Figure 2:
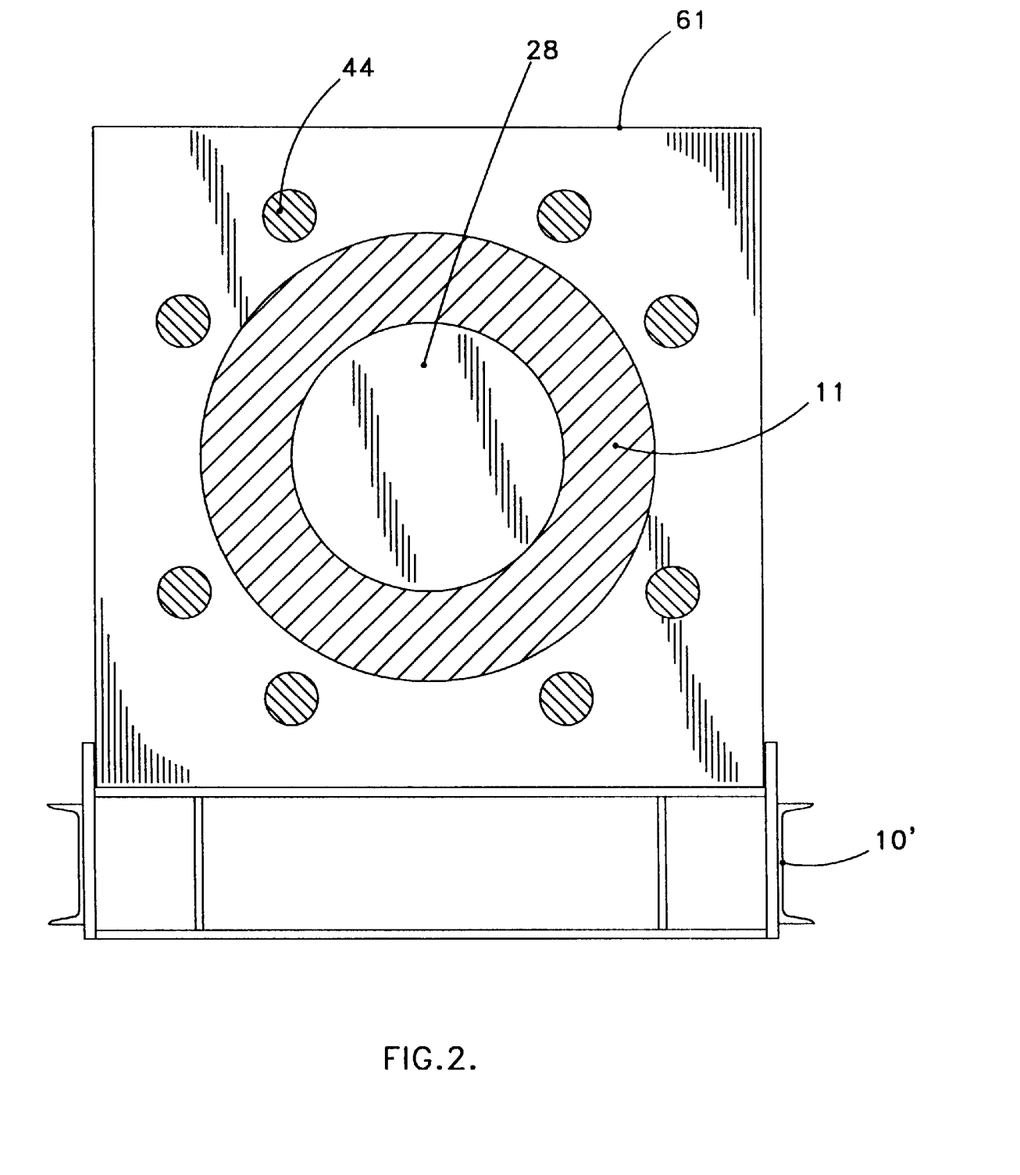
FIG. 2 is an enlarged cross-sectional view taken along line 2—2 of FIG. 1.

One of the important features of the present invention is the extremely high pressure used to compress the material to be comminuted. The piston 13 has a piston face 28 shown in FIG. 2 which exerts a pressure of at least 500 psi. For a piston having a face with a diameter of 18", a pressure of 1000 psi would require a force of 254,000 lbs. Preferably, an even higher pressure is utilized up to 8,000 psi which requires a force of over 2,000,000 lbs. Still further, this pressure may be increased by the narrowing of the cylinder size to one or more small exit ports. Preferably, the sum of the exit ports are no more than about one-fourth of the interior cylinder area. While not wishing to be bound by any theory, it is believed that this size reduction thus provides an even greater pressure at the exit so that when the compressible material 30 shown in FIG. 6 reaches the exit port 16, it is compressed at such a high pressure that minimum voids are present. Thus, the material which meets the blades 26 is no longer a compressible product, but instead, is of the consistency of an incompressible solid which can be shaved just as if one were planing or sanding wood. It may assist the understanding of the remarkable effect of the process of the present invention to point out a fact of nature. Cured rubber, if it is free of voids, is, like water, incompressible. The loose collection of cured rubber pieces is initially compressible, but once the voids are removed, it will not compress further. The prior art processes have tried to pulverize rubber with a minimum of compression and the result, rather than a shaving or cutting action exhibited by the present invention, require a rubbing action which generates an undesirable amount of heat or a chopping action which results in large chunks. Alternatively, a collection of not highly compressed vulcanized rubber particles resist cutting because of their elastic nature and thus, only larger particles result.

Figure 5:
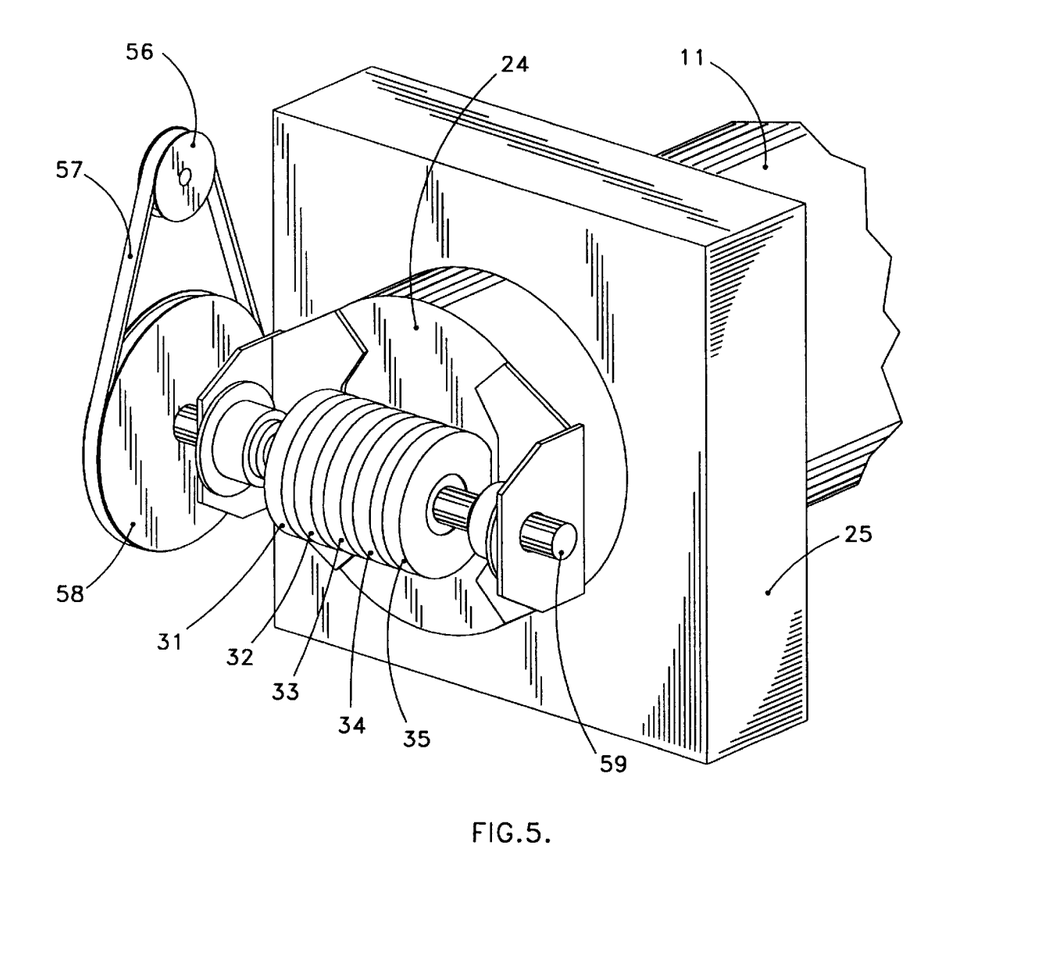
FIG. 5 is a perspective view of the exterior of the cylinder head and the rapidly moving cutters.

The cutter blades are mounted on cutter wheels, such as wheels 31, 32, 33, 34, and 35 shown in FIG. 5. In order to produce a very fine powder 27, it is necessary that the cutter wheels rotate to provide a relatively high speed at the solid incompressible void free cuttable face 36 in FIG. 6 of the compressible material. The linear speed of the blade across the solid incompressible void free cuttable face 36 should be at least about 5 feet per second, and as high as 80 feet per second. At the higher end of these speeds, the face 36 is shaved into particles as fine as 200 mesh, which is comparable to particles having a diameter of about $5/1,000$ of an inch. Finer or coarser particles may be produced by varying the cutter speed and/or the piston feed speed.

When rubber particles are particulated to a size of about $5/1000$ of an inch, such cured rubber particles can be added back and blended with uncured rubber and the result is the particles may be dispersed in the uncured rubber. When the uncured rubber is then cured, the resulting product is not degraded in any measurable amount, unlike the result when fillers such as clay are added. Thus, one could take tire treads which preferably have been separated from the bead and reinforcing portions by conventional means and pulverize them to a size where they not only can be merely disposed of, but also can be added back to provide a product which has the same value as compounded rubber.

Figure 3:
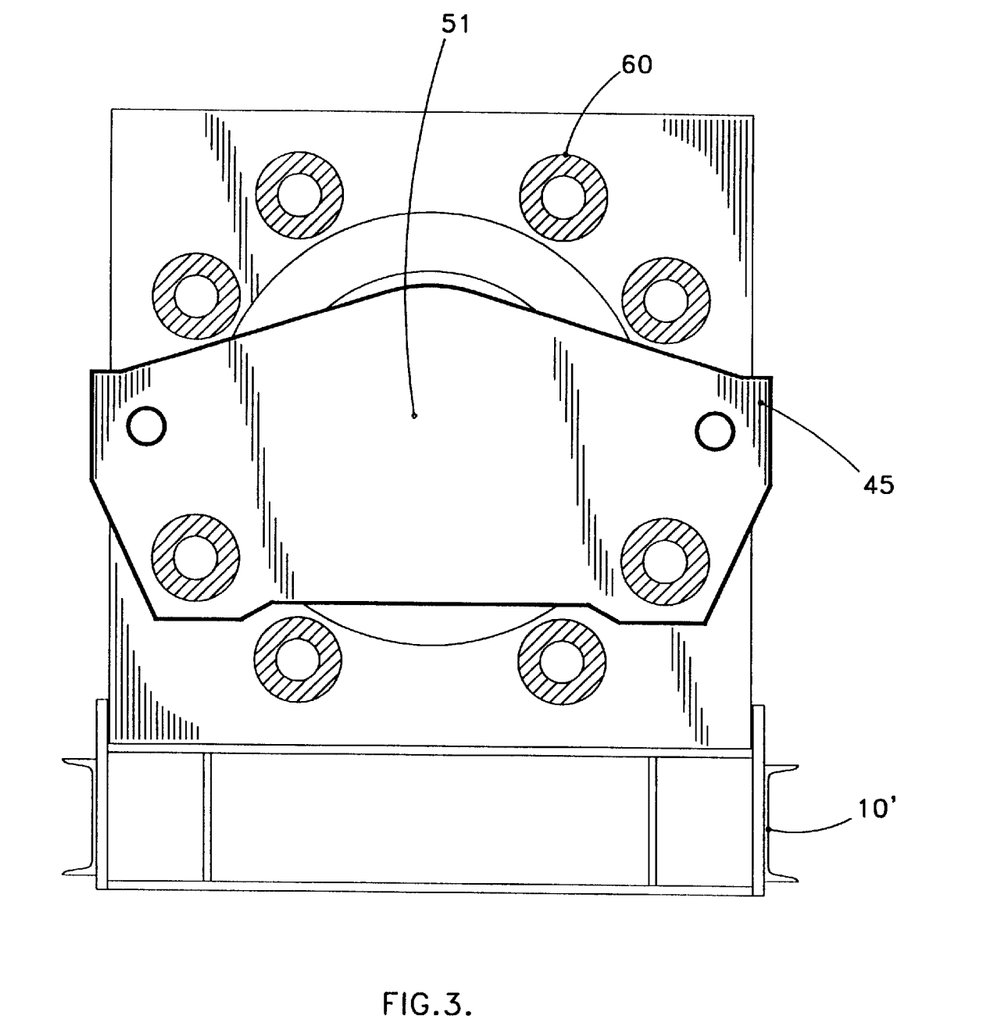
FIG. 3 is an enlarged cross-sectional view taken along line 3—3 of FIG. 1.

A particularly effective way of reaching the immense pressures necessary for the process of the present invention is shown in FIG. 1 of the drawings. The apparatus 10 utilizes two separate piston and cylinder assemblies. The smaller piston is piston 13 which passes along cylinder 11 to contact a larger piston 40. Piston 40 is a force applying piston which is held in a force applying cylinder 41. Cylinder 41 is held between end plates 42 and 43 which includes a hydraulic fluid passageway (not shown). A first inner end plate 43 is held to end plate 42 by a plurality of tie rods, the position of which is shown in phantom view and indicated by reference character 44. It has been found that eight tie rods are sufficient. The rods 44 are threaded with spacers between first inner end plate 43 and second inner end plate 60. An additional eight tie rods 44 are threaded into spacers 60 at second inner end plate 44. These additional tie rods are held to cylinder head 25 by nuts. The unit could, of course, be held by welding or other known methods. Because of the immense pressures needed, the steel end plate 42 and the cylinder head 25 are preferably about 8" thick. Thus, when hydraulic fluid is passed against an outer face of force applying piston 40, this is transferred to a yoke 45. This transfer is done merely by the pressing of an outer face 46 of force applying piston 40 against an outer face of yoke 45. Yoke 45, thus, moves to a position indicated by reference character 45' in FIG. 1 where the compressible material contacting piston 13 has been moved to the end of the length of uniform cross-sectional shape 12 of cylinder 11. When the force applying piston is withdrawn, it does not by itself pull back yoke 45. Instead, a second set of kicker piston and cylinder assemblies 50 pull back the yoke 45. This permits the relatively easy initial compression of materials passed through inlet 14 by merely placing materials through inlet 14 and extending kicker pistons 50 to move yoke 46. Thus, the compressible materials contacting piston 13 slightly pack the materials. After packing, the kicker pistons 50 withdraw piston 13 and more materials may be added through inlet 14 until cylinder 11 and exit length 15 are packed. This movement requires only a small volume of hydraulic fluid. Only after the material has been packed, is the force applying piston used to create the immense pressure discussed above. The face of yoke 45 is shown in FIG. 3 and indicated by reference character 51.

Figure 7:
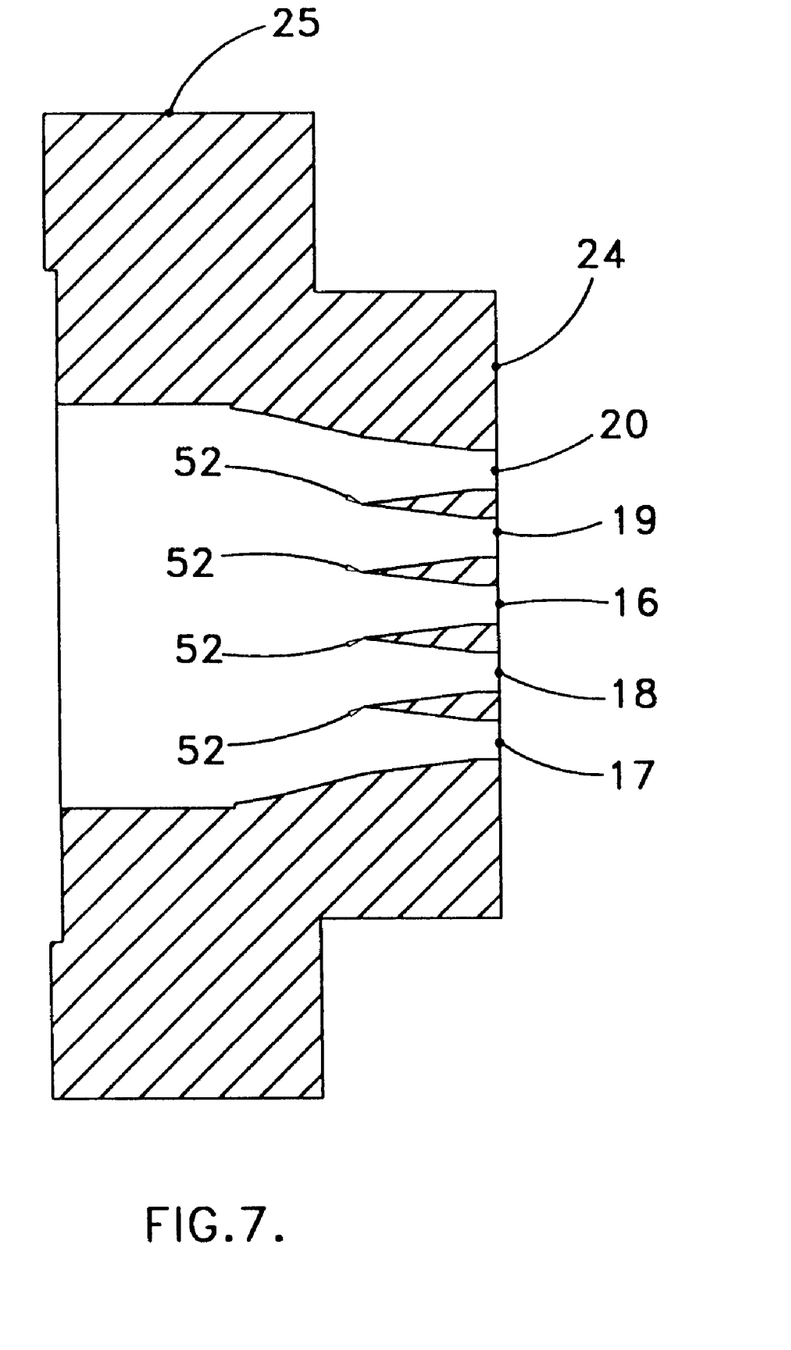
FIG. 7 is an enlarged horizontal cross-sectional view of the cylinder head of the apparatus of FIG. 1.

Another important feature of the present invention is the shape of the cylinder head 25 between adjacent ports. As shown in FIG. 7, the inner section is narrowed down to a sharp edge 52 so that material is not subjected to an unnecessary pressure drop. The term "smoothly narrowed exit length" is intended in a somewhat broad sense so that if a small step is present, it would still be considered smoothly narrowed as long as the general path of material does not have a radical reduction in cross-sectional area at one plane.

Figure 8:
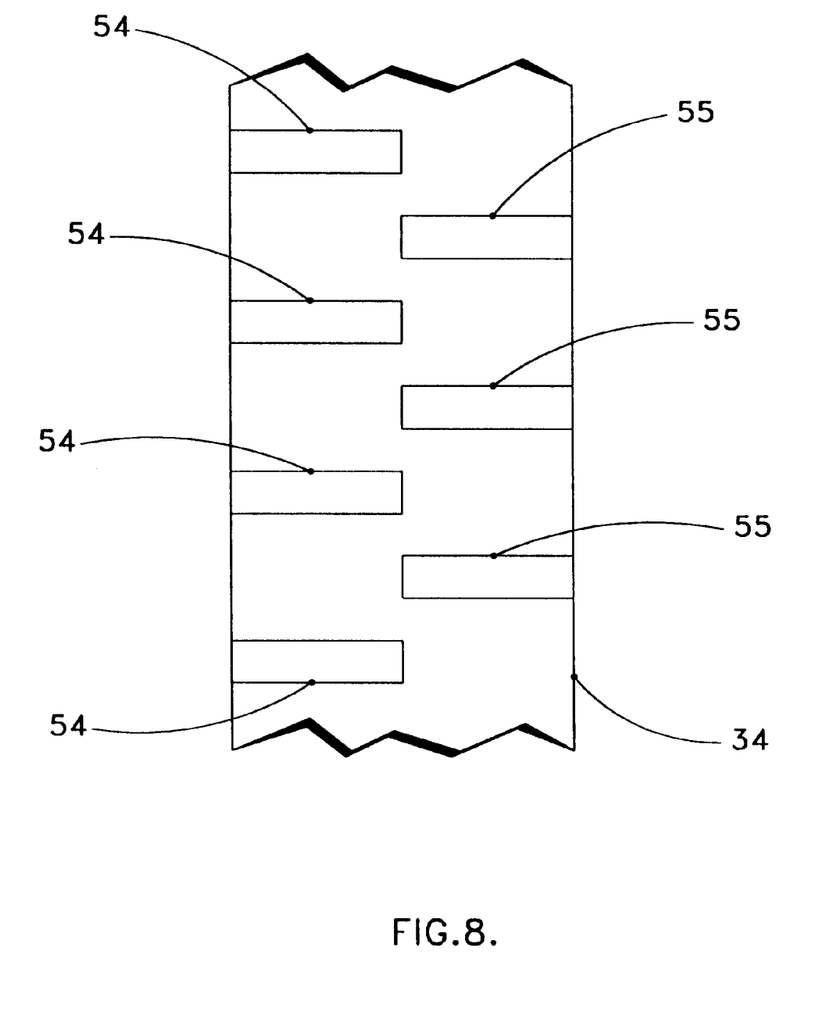
FIG. 8 is a front view of a portion of the cutter wheel shown in FIG. 6.
Figure 9:
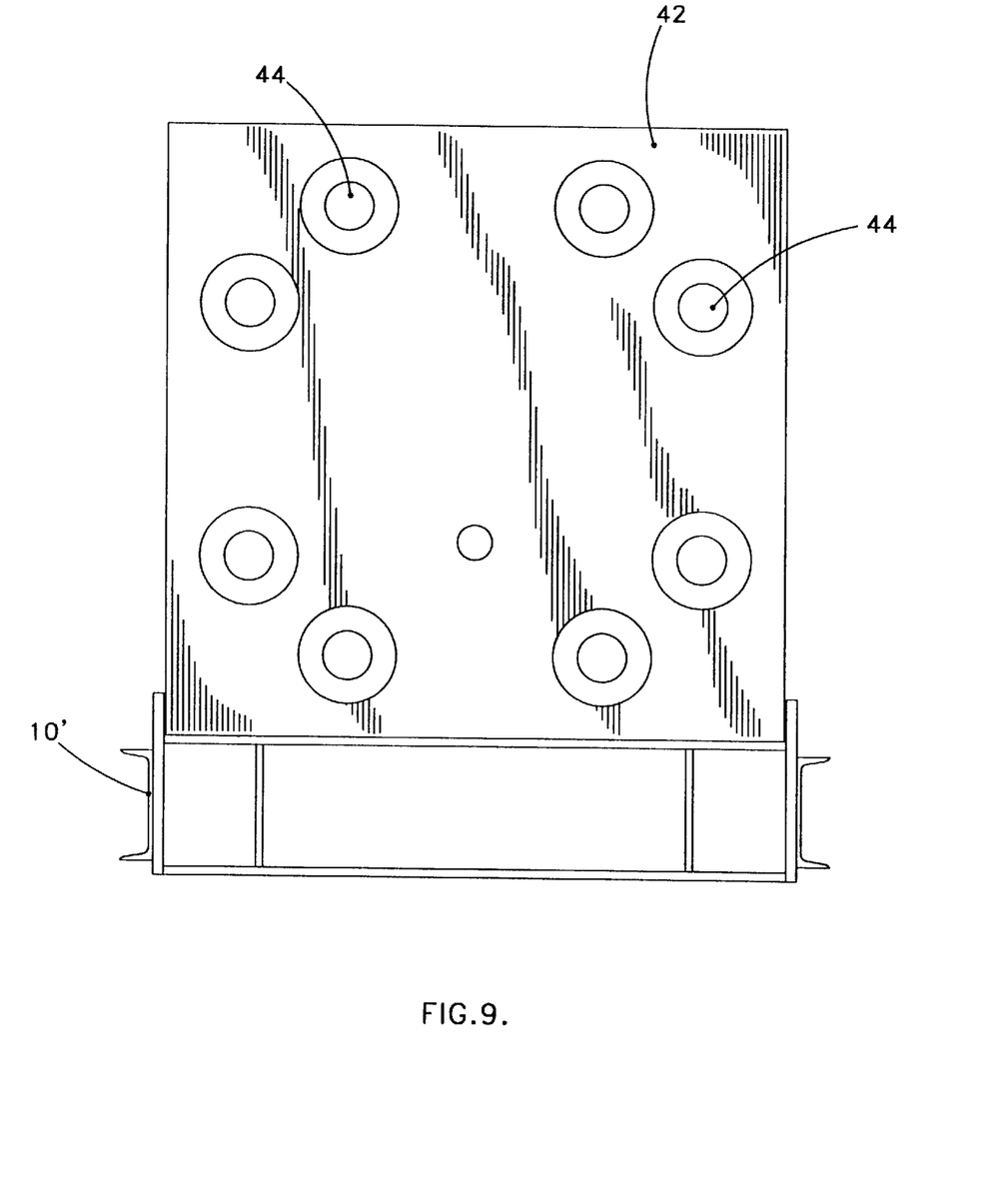
FIG. 9 is a rear view taken along 9—9 of FIG. 1.

Another important feature of the present invention is the use of cutter blade assemblies which have a plurality of staggered knives 54, 55 shown in FIG. 8. The staggering of the knives reduces the cutting area of a given blade and creates an exceptionally fine particle size. A system for driving the blades is shown in FIG. 5 where a motor, not shown, drives a pulley 56 which drives belt 57, and in turn, pulley 58. Pulley 58 is connected to spindle 59 which turns with the cutter blades.

Another appropriate way of discussing the speed of the cutter blades is to compare them to the speed with which the compressible material 30, FIG. 6, passes out of the exit port. Very fine particles would not necessarily result merely from cutter head speed unless the cutter head speed is relatively far greater than the speed of the materials. This relative speed should be such that the cutter moves at least about 500 times the speed at which the compressible material exits the exit port. The ratio of these speeds allows for variations in the particle sizes produced. Also, changing the cutter configuration, cutter speeds and feed speeds permit the operator to optimize the configuration of the comminuted product.

While the present invention has been discussed under the assumption that a piston would be used to compress the compressible materials, it is possible that another force applying mechanism such as a screw or other force applying apparatus could provide the requisite pressure for some materials. Thus, the term "force applying member" is intended to include structures other than a piston.

The apparatus of the present invention is not only effective in reducing waste cured rubber to a fine powder, but it can also be used on a wide range of other materials. For instance, a problem is created in the disposal of used carpeting in that such carpeting requires a substantial volume of space in transporting and disposing of same at a waste disposal location. The apparatus of the present invention can be used to reduce such products to a very fine powder. The powder can in fact be separated into, for instance, nylon pieces, which in turn could be recycled. This separation would be carried out by air, vibration, centrifuge, floatation, or any other known means. Another cross linked material that has created a dilemma to recycle is polymeric grocery bags which are not thermoplastic but which are cross linked. Such materials can also be ground to a fine powder in the apparatus of the present invention. This variety of materials that can be used helps to explain the meaning of the term "compressible" as used herein. A compressible material, as opposed to, for instance, gravel, will be compressed and with sufficient pressure compressed to a state where there are essentially no voids between the various particles. Gravel, in contrast, will never become void free under pressure. When, for instance, a carpet is so compressed, it again exhibits a cutting surface not unlike wood which can be efficiently shaved away to provide a very fine resulting powder. Because the comminuting action is by the shaving of the compressed surface by sharp knives, the process is not particularly noisy. Likewise, it does not produce a significant amount of heat in the resulting powdered material. It is also contemplated that some materials will compress to a more easily comminuted form if heated or cooled. This temperature change would be combined with the high pressure at the piston face of at least 500 psi. Furthermore, lubrication can be added to some materials to reduce the pressure drop due to friction. The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. An apparatus for comminuting a collection of compressible materials comprising:

a frame supported on a surface;

a cylinder supported on said frame, said cylinder having a hollow interior which has a first length of uniform cross-sectional shape having an interior cylinder area which terminates in a smoothly narrowed exit length to at least one exit port formed in a cylinder head having an outer face, the total area of the sum of the areas of all of said at least one exit port having a total port area no larger than about one fourth of the interior cylinder cross-sectional area;

a force applying member having a force applying member end portion movable along said first length of uniform cross-sectional shape for compressing a collection of materials to be comminuted, said force applying member exerting a pressure at said force applying member end portion of at least 500 psi whereby said collection of compressible materials are compressed to an extent that there are essentially no voids in the collection of compressible materials at the at least one exit port and said collection of compressible materials form a solid, incompressible, essentially void free, cuttable face at said at least one exit port; and a rapidly moving cutter including means for cutting mounted thereon so that said means for cutting move about normal to a direction of movement of said collection of compressible materials at said cuttable face and at a speed of at least about five feet per second and wherein said means for cutting move in a path which completely covers said at least one opening and extends inwardly from said outer face of said cylinder head whereby said compressible materials are cut into very fine particles.

2. The apparatus for commuting a collection of compressible materials of claim 1 wherein there are a plurality of exit ports.

3. The apparatus for comminuting a collection of compressible materials of claim 2 wherein adjacent ports are separated by a wall which has a sharp inner edge within said smoothly narrowed exit length.

4. The apparatus for comminuting a collection of compressible materials of claim 2 wherein there is a separate rapidly moving cutter external of each exit port.

5. The apparatus for comminuting a collection of compressible materials of claim 2 wherein there are five exit ports and five cutter wheels, one cutter wheel across each exit port.

6. The apparatus for comminuting a collection of compressible materials of claim 1 wherein said means for cutting comprise a plurality of knives extending from a cutter wheel, said cutter wheel being mounted on a spindle positioned exteriorly of an outer face of a cylinder head in which said at least one exit port is formed.

7. The apparatus for comminuting a collection of compressible materials of claim 1 wherein said at least one exit port is rectangular.

8. The apparatus for comminuting a collection of compressible materials of claim 1 wherein the force applying member is capable of exerting a pressure of up to 8,000 psi at the force applying member end portion.

9. The apparatus for comminuting a collection of compressible materials of claim 1 wherein the speed of movement of said means for cutting is between five and one hundred feet per second.

10. A process for reducing a collection of vulcanized rubber pieces into a fine powder comprising:

placing pieces of vulcanized rubber in a cylinder having a piston at one end and a cylinder head at an exit end having an exit port having an outer face and having an area less than one fourth of an area of a face of said piston;

forcing the piston along the cylinder and against the pieces of vulcanized rubber to create a pressure on the face of said piston of at least 1,000 psi thereby compressing and eliminating any voids between the pieces of vulcanized rubber and urging the resulting compressed rubber pieces into said exit port; and passing a plurality of cutting means at a rate of between five and one hundred feet per second immediately adjacent said outer face of said exit port thereby causing the cutting means to cut very fine pieces from the compressed rubber pieces at the exit port.

11. The process of claim 10 wherein there are a plurality of exit ports and a plurality of cutting means.

12. An apparatus for comminuting cross-linked compressible materials comprising:

a frame supported on a surface;

a compressible material contacting cylinder supported on said frame, said compressible material contacting cylinder having a hollow interior which has a first length of uniform cross-sectional shape having a cylinder area which terminates in a smoothly narrowed exit length to at least one exit port formed in a cylinder head, the total area of the sum of the areas of all of said at least one exit port having a total port area no larger than about one fourth of the cylinder area;

a compressible material contacting piston having a compressible material contacting piston face movable along said first length of uniform cross-sectional shape for compressing material to be comminuted, said compressible material contacting piston exerting a pressure at said compressible material contacting piston face of at least 500 psi whereby said compressible materials are compressed to an extent that there are substantially no voids in the compressible materials and at the at least one exit port and said compressible materials form a solid, incompressible, near void free, cuttable face at said at least one exit port, said compressible material contacting piston having a contact face external of said compressible material contacting cylinder;

a rapidly moving cutter including a plurality of cutting blades mounted thereon so that said cutting blades move about normal to a direction of movement of said compressible materials at said exit port and at a speed of at least about five hundred times the speed at which the compressible material exits said at least one exit port and wherein said cutting blades are spaced so that a plurality of cutting blades are in contact with said cuttable face at all times and said cutting blades move in a path which completely covers said at least one exit port whereby said compressible materials are cut into very fine particles;

a force applying piston having a force applying face removably contactable with said contact face of said compressible materials contacting piston;

means for moving said force applying piston against said contact face of said compressible materials contacting piston;

a compressible materials entry port in said compressible materials contacting cylinder for feeding materials to be comminuted; and a plurality of small cylinder assemblies affixed at one end to said frame, said plurality of small cylinder assemblies each including a cylinder, a piston and an output piston rod affixed so that they apply a force to said compressible materials contacting piston to permit said small cylinder assemblies to compress and withdraw said compressible materials contacting piston without the necessity of moving said force applying piston until it is desired to place the compressible materials under a pressure of at least 500 psi.

13. The apparatus for comminuting a collection of compressible materials of claim 12 wherein said rapidly moving cutter comprises a cutter wheel having a plurality of sets of staggered blades extending outwardly of a peripheral surface of said cutter wheel.

14. The apparatus for comminuting a collection of compressible materials of claim 12 wherein said means for moving said force applying piston against said compressible materials contacting piston comprises surrounding said force applying piston in a force applying cylinder and conducting a hydraulic fluid against a rear face of said force applying piston.

15. The apparatus for comminuting a collection of compressible materials of claim 14 wherein said hydraulic fluid is capable of exerting at least 100 psi.

* * * * *